(12) United States Patent
Filippov et al.

(10) Patent No.: US 6,860,420 B2
(45) Date of Patent: Mar. 1, 2005

(54) METHOD OF JOINING METAL OILFIELD TUBULARS AND WELL PROVIDED THEREWITH

(75) Inventors: Andrei Gregory Filippov, Katy, TX (US); Peter Oosterling, Rijswijk (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/239,658

(22) PCT Filed: Mar. 29, 2001

(86) PCT No.: PCT/EP01/03641
§ 371 (c)(1), (2), (4) Date: Sep. 24, 2002

(87) PCT Pub. No.: WO01/72464
PCT Pub. Date: Oct. 4, 2001

(65) Prior Publication Data
US 2003/0047588 A1 Mar. 13, 2003

(30) Foreign Application Priority Data
Mar. 29, 2000 (EP) .......................... 00302576

(51) Int. Cl.⁷ .............................. B23K 31/02
(52) U.S. Cl. ..................... 228/246; 228/254
(58) Field of Search ................ 228/245, 246, 228/248.1, 256, 261, 193, 194, 234.1, 254; 219/603, 607, 59.1, 61

(56) References Cited

U.S. PATENT DOCUMENTS

| | | | | |
|---|---|---|---|---|
| 3,427,707 A | | 2/1969 | Nowosadko | |
| 4,780,161 A | * | 10/1988 | Mizuhara | 156/89.24 |
| 4,842,305 A | * | 6/1989 | Kistenich et al. | 285/21.2 |
| 4,962,579 A | | 10/1990 | Moyer et al. | |
| 5,176,410 A | * | 1/1993 | Beyer | 285/187 |
| 5,360,242 A | * | 11/1994 | Argent | 285/330 |
| 5,464,146 A | * | 11/1995 | Zaluzec et al. | 228/208 |
| 5,699,955 A | | 12/1997 | Shimizu et al. | |
| 5,752,725 A | * | 5/1998 | El-Sobky | 285/21.1 |
| 5,921,591 A | * | 7/1999 | Argent | 285/330 |
| 6,419,147 B1 | * | 7/2002 | Daniel | 228/194 |
| 6,514,631 B1 | * | 2/2003 | Yamamoto et al. | 428/682 |
| 2002/0014514 A1 | * | 2/2002 | Shimizu et al. | 228/104 |
| 2003/0047588 A1 | * | 3/2003 | Filippov et al. | 228/120 |

FOREIGN PATENT DOCUMENTS

| | | | |
|---|---|---|---|
| JP | 401053765 A | * 3/1989 | |
| JP | 401237085 A | * 9/1989 | |
| WO | 98 33619 | 8/1998 | B23K/13/02 |
| WO | WO99/09230 | * 2/1999 | |

OTHER PUBLICATIONS

Honeywell METGLAS MBF–15 Nickel–Based Brazing Foil (Sep. 2000).*

* cited by examiner

*Primary Examiner*—Kiley S. Stoner

(57) ABSTRACT

A method of interconnecting a pair of metal oilfield tubulars having complementary tapered edges with a common contact surface when the tubulars are interconnected, is provided. The method consist of having a melting temperature lower than the melting temperature of the tubulars, interconnecting the tubulars whereby the think layer of metal is in between the tubulars, applying heat to the thin layer of metal so as to melt the thin layer of metal, and cooling the tapered edges whereby a metallurgical bond is created between the tubulars.

37 Claims, 1 Drawing Sheet

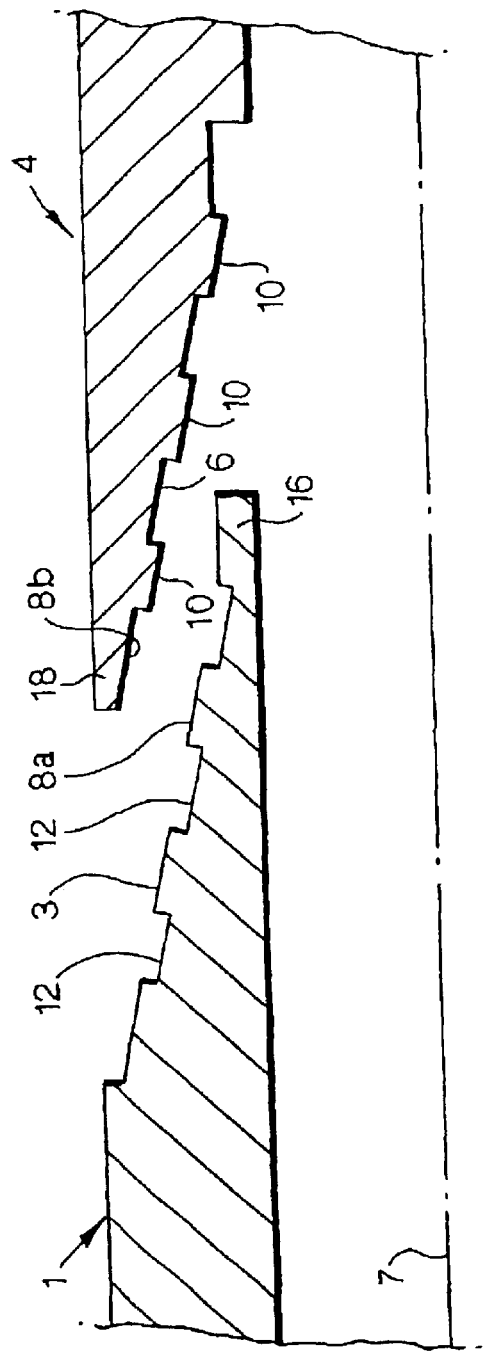
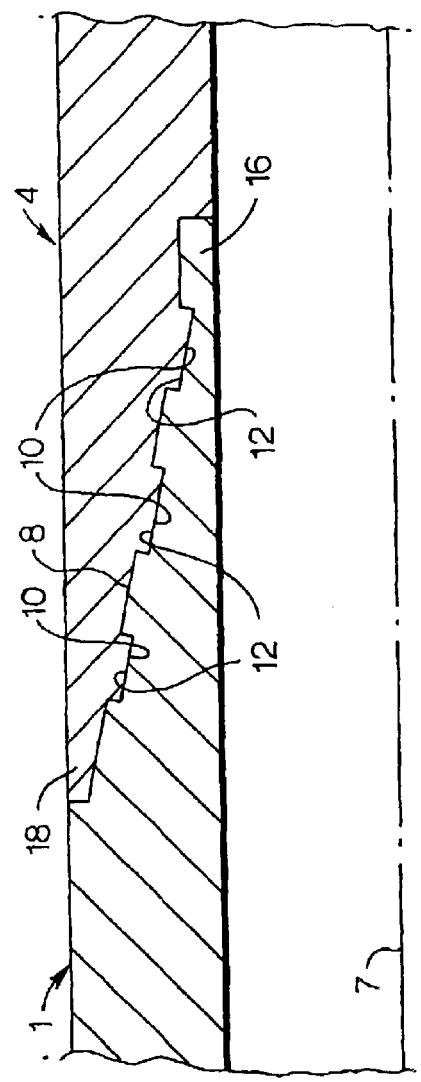

METHOD OF JOINING METAL OILFIELD TUBULARS AND WELL PROVIDED THEREWITH

FIELD OF THE INVENTION

The invention relates to a method of interconnecting metal oilfield tubulars.

BACKGROUND OF THE INVENTION

Such a method is described in U.S. Pat. specification No. 5,699,955 according to which two Ti-pipes are firmly joined by solid diffusion bonding. The pipes are butted and heated under pressure in a non-oxidizing atmosphere, while a Ti-layer is disposed at the interface of butting by either (1) inserting a sheet for bonding made of Ti having a thickness of 500 µm or less between the butted faces, or (2) previously forming a Ti-layer for bonding having a thickness of 1 µm or more on at least one of the butted faces by any method such as vapour deposition.

A drawback of this method is that the butted ends must be very carefully prepared and aligned at high accuracy before being pressed together to being bonded.

Current premium pipe joining technology uses a metal-to-metal contact area or a rubber or Teflon seal ring to effect a seal in a threaded connection. Even with such a seal, leaks are often experienced in the connection. This is undesirable in most applications. Leaks become even more common and troublesome when a threaded connection is radially expanded.

To overcome the above drawbacks the present inventors propose the following method.

SUMMARY OF THE INVENTION

Therefore the invention relates to a method of interconnecting a pair of metal oilfield tubulars having complementary tapered edges with a common contact surface when the tubulars are interconnected, the method comprising providing the tapered edge of at least one of the tubulars at the common contact surface thereof with a thin layer of a metal having a melting temperature lower than the melting temperature of the tubulars, interconnecting the tubulars whereby the thin layer of metal is in between the tubulars, applying heat to the thin layer of metal so as to melt the thin layer of metal, and cooling the tapered edges whereby a metallurgical bond is created between the tubulars.

It is thereby achieved that a strong bond and a reliable metal-to-metal seal is created between the tapered edges at their common contact surface. Furthermore, the need for very careful preparation and alignment of the tubulars is obviated since the tapered edges have a relatively large contact area even if these are less accurately prepared or aligned.

The present invention also relates to a hydrocarbon fluid production well provided with a series of tubulars which have been connected with each other by means of the present method.

Suitably the thin layer of metal is selected from a material suitable for brazing, amorphous bonding or diffusion welding of the tubulars so as to form said metallurgical bond.

It is preferred that the thin layer of metal is composed of Fe, Ni, Cu, Ag, Ti, brass, bronze or an amorphous metal.

The thin layer of metal can be deposited on the tapered edge, for example, in the form of a spray, paint, foil, tape, ring, grease or suspension in a suitable gel.

The heat to melt the thin layer of metal can be applied, for example, by means of a flame, inductive heating, chemical reaction, heat convection or an electrical resistance process.

Suitably the angle of intersection of the tapered edges with the longitudinal axes of the tubulars is in the range of from about 0 to about 90°, more preferably from about 10 to about 45° and most preferably from about 10 to about 40°.

In an attractive application of the method of the invention, the tubulars are radially expanded after creating the metallurgical bond. Such expansion process can take place in a wellbore formed in the earth formation, for example in order to create a casing in the wellbore.

BRIEF DESCRIPTION OF THE DRAWINGS

The invention will be described hereinafter in more detail and by way of example, with reference to the accompanying drawings in which:

FIG. 1 schematically shows a longitudinal cross-section of an embodiment of a pair of oilfield tubulars to be used in the method of the invention, before interconnection thereof; and FIG. 2 schematically shows a longitudinal cross-section of the oilfield tubulars of FIG. 1 after interconnection thereof.

DETAILED DESCRIPTION OF THE INVENTION

Referring to FIGS. 1 and 2 there is shown a first metal oilfield tubular in the form of a first wellbore casing 1 provided with a first tapered edge 3, and a second metal oilfield tubular in the form of a second wellbore casing 4 provided with a second tapered edge 6 complementary to the first tapered edge 3. The tapered edges form a pin/box type stab-in connector whereby the first tapered edge 3 is the pin member of the connector and the second tapered edge 6 is the box member of the connector. The casings 1, 4 are aligned and have a common longitudinal axis 7.

The tapered edges 3, 6 have a common contact surface 8 (FIG. 2) when the casings are interconnected. In FIG. 1 the individual surfaces of the first and second tapered edges 3, 6 which form the common contact surface 8 are indicated by respective reference signs 8a, 8b. The contact surfaces 8a, 8b are provided with complementary ribs 10 and grooves 12.

The pin member 3 has an end portion in the form of lip 16, and the box member 6 has an end portion in the form of lip 18.

During normal operation a thin layer of a metal (not shown) having a melting temperature lower than the melting temperature of the tubulars is deposited on contact surface 8a or contact surface 8b, prior to interconnecting the pin member 3 and the box member 6. The layer can also be deposited in one or more of the grooves 12. The layer of metal advantageously includes Copper or Nickel based alloys, or another alloy or an amorphous metal. If the metal forms a brazing composition it may also contain a flux material—typically a borate. The flux material may be embedded in the brazing composition or be distributed over the surface of the brazing composition before brazing is commenced.

The thin layer of metal is suitably deposited on the contact surface 8a, 8b in the form of a spray, paint, tape, ring, grease or suspension in a suitable gel.

After the layer of metal has been applied to one or both the contact surfaces 8a, 8b, or into the grooves 12, the pin member 3 and the box member 6 are stabbed together whereby the ribs 10 enter into the respective grooves 12, as shown in FIG. 2. Thereafter, heat is applied to the pin and box members 3, 6 so as to melt the thin layer(s) of metal.

Such heating is preferably effected by means of a flame, inductive heating, chemical reaction, heat convection or an electrical resistance process.

As a result of this heating process the temperature of the thin metal layer is suitably raised to a value within the range of from about 400 to about 1100°. While heat is applied and the temperature thereby rises, a pressure may or may not be applied between the pipe ends to be bonded, this situation being advantageously maintained during a period of time of at least 10 seconds.

Suitably the thin metal layer includes an amorphous, bonding composition as used in the so-called amorphous bonding technique. Such layer can be applied as a thin foil between the tapered edges or can be sprayed on at least one of the tapered edges.

The amorphous bonding composition is composed predominantly of Fe, Cu, Ag, Ni or Ti, depending on the material to be joined, but in all cases contains boron. The tubes are then heated and held at a predetermined temperature, usually by induction heating. On reaching this temperature, which is just above the melting point of the amorphous composition, but much lower than that of the base material, diffusion of certain elements occurs, principally boron, from the amorphous composition into the base material. The resultant modification to the composition of the amorphous material causes its melting point to increase and hence isothermal solidification occurs thereby creating a very strong bond.

Brazing or amorphous bonding of non-butted oilfield tubulars has the following potential advantages:

it is applicable to a wide range of materials including carbon steel, stainless steel and titanium;

no protrusions occur after bonding or brazing; hence flush connections are formed;

it can be carried out automatically; hence no skilled operators are required;

the required heat inputs are lower than for welding;

it is very rapid;

the tubulars are automatically axially aligned;

a large bonding surface and thus a strong bond is created; and it is a cost-effective process.

For these reasons brazing or amorphous bonding of tapered edges of adjoining oilfield tubulars can be of significant benefit for joining carbon steel and corrosion-resistant alloy well casings, tubings and liners.

The casing and tubing strings which have been joined according to the present invention provide a leak-free, seamless, lifetime completion and potentially enable slimmer, more cost-effective wells to be pursued.

After the metallurgical bond is created between the pin member 3 and box members 6, the casings 1, 4 are radially expanded using a suitable expansion cone or other expansion device. During the expansion process, the lip 16 of the pin member 3 and the lip 18 of the box member have a tendency to bend radially inwards due to the fact that the radially inner portions of the pin and box members are subjected to a larger circumferential strain than their respective radially outer portions. Such radially inward bending of the lip 16 of the pin member 3, and the consequent (partial) loss of the sealing capacity of the connector, is adequately prevented by the metallurgical bond created between the pin and box members.

We claim:

1. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal; and cooling the tapered edges whereby a metallurgical bond is created between the tubulars.

lowering the tubulars are lowered into a wellbore formed in an earth formation; and expanding radially the tubulars in the wellbore.

2. The method of claim 1, wherein the thin layer of metal is selected from a material suitable for brazing, amorphous bonding or diffusion welding of the tubulars so as to form said metallurgical bond.

3. The method of claim 1, wherein the thin layer of metal is composed of Fe.

4. The method of claim 1, wherein the thin layer of metal is deposited on the tapered edge in the form of a spray.

5. The method of claim 1, wherein the heat is applied to melt the thin layer of metal by means of a flame.

6. The method of claim 1, wherein the heat is applied so as to heat the thin layer of metal to a temperature in the range of from about 400 to about 1100° C., at a pressure of at least 5 MPa and during a period of time of at least 10 seconds.

7. The method of claim 1, wherein the angle of intersection of the tapered edges of the tubulars with their axes is in the range of from about 10° to about 30°.

8. The method of claim 1, wherein said tapered edges are formed by a tubular connector comprising a pin member and a box member.

9. The method of claim 1, wherein the thin layer of metal is comprised of Ni.

10. The method of claim 1, wherein the thin layer of metal is comprised of Cu.

11. The method of claim 1, wherein the thin layer of metal is comprised of Ag.

12. The method of claim 1, wherein the thin layer of metal is comprised of Ti.

13. The method of claim 1, wherein the thin layer of metal is comprised of brass.

14. The method of claim 1, wherein the thin layer of metal is comprised of bronze.

15. The method of claim 1, wherein the thin layer of metal is comprised of an amorphous metal.

16. The method of claim 1, wherein the thin layer of metal is deposited on the tapered edge in the form of a paint.

17. The method of claim 1, wherein the thin layer of metal is deposited on the tapered edge in the form of a foil.

18. The method of claim 1, wherein the thin layer of metal is deposited on the tapered edge in the form of a tape.

19. The method of claim 1, wherein the thin layer of metal is deposited on the tapered edge in the form of a ring.

20. The method of claim 1, wherein the thin layer of metal is deposited on the tapered edge in the form of a grease.

21. The method of claim 1, wherein the thin layer of metal is deposited on the tapered edge in the form of a suspension in a suitable gel.

22. The method of claim 1, wherein the heat is applied to melt the thin layer of metal by means of an inductive heating.

23. The method of claim 1, wherein the heat is applied to melt the thin layer of metal by means of a chemical reaction.

24. The method of claim 1, wherein the heat is applied to melt the thin layer of metal by means of a heat convection.

25. The method of claim 1, wherein the heat is applied to melt the thin layer of metal by means of an electrical resistance process.

26. The method of claim 1, wherein the angle of intersection of the tapered edges of the tubulars with their axes is in the range of from about 10° to about 30°.

27. A method of interconnecting a pair of metal oilfield tubulars having complementary tapered edges with a common contact surface when the tubulars are interconnected, the method comprising:

provide the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal by means of a flame; and cooling the tapered edges whereby a metallurgical bond is created between the tubulars.

28. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal; and cooling the tapered edges whereby a metallurgical bond is created between the tubulars, wherein the angle of intersection of the tapered edges of the tubulars with their axes is in the range of from about 0° to about 90°.

29. The method of claim 28 wherein the angle of intersection of the tapered edges of the tubulars with their axes is in the range of about 10° to about 30°.

30. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of Fe; and cooling the tapered edges whereby a metallurgical bond is created between the tubulars.

31. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of Ag; and cooling the tapered edges whereby a metallurgical bond is created between the tubulars.

32. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of Ti; and cooling the tapered edges whereby a metallurgical bond is created between the tubulars.

33. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of Cu; and cooling the tapered edges whereby a metallurgical bond is created between the tubulars.

34. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of brass; and cooling the tapered edges whereby a metallurgical bond is created between the tubulars.

35. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars;

interconnecting the tubulars whereby the thin layer of metal is in between the tubulars;

applying heat to the thin layer of metal so as to melt the thin layer of metal, the metal comprised of bronze; and cooling the tapered edges whereby a metallurgical bond is created between the tubulars.

36. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars, wherein the thin layer of metal is deposited on the tapered edge in the form of a grease;

interconnecting the tubulars whereby the thin layer of metal is in between the tubulars;

applying heat to the thin layer of metal so as to melt the thin layer of metal; and cooling the tapered edges whereby a metallurgical bond is created between the tubulars.

37. A method of interconnecting a pair of metal oilfield tubulars having complementary tapered edges with a common contact surface when the tubulars are interconnected, the method comprising:

providing the tapered edge of at least one of the tubulars at the common contact surface thereof with a thin layer of a metal having a melting temperature lower than the melting temperature of the tubulars, wherein the thin layer of metal is deposited on the tapered edge in the form of a suspension in a suitable gel;

interconnecting the tubulars whereby the thin layer of metal is in between the tubulars;

applying heat to the thin layer of metal so as to melt the thin layer of metal; and cooling the tapered edges whereby a metallurgical bond is created between the tubulars.

* * * * *